Sept. 9, 1930.  W. E. WOODARD  1,775,337
LOCOMOTIVE
Filed Oct. 12, 1926
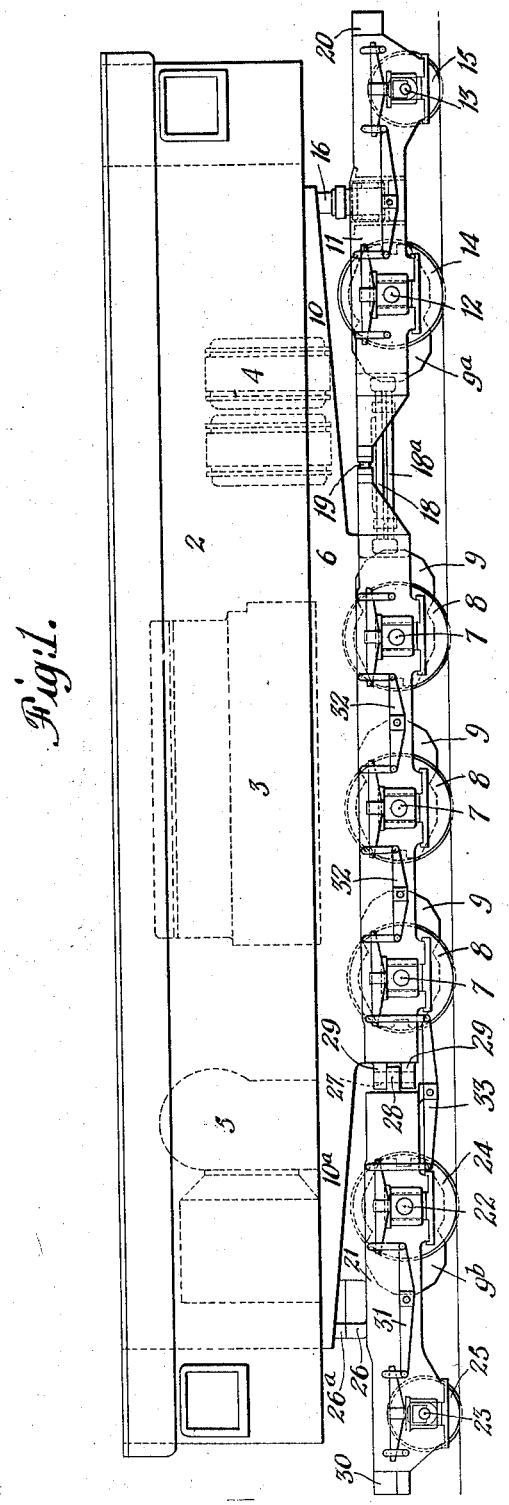
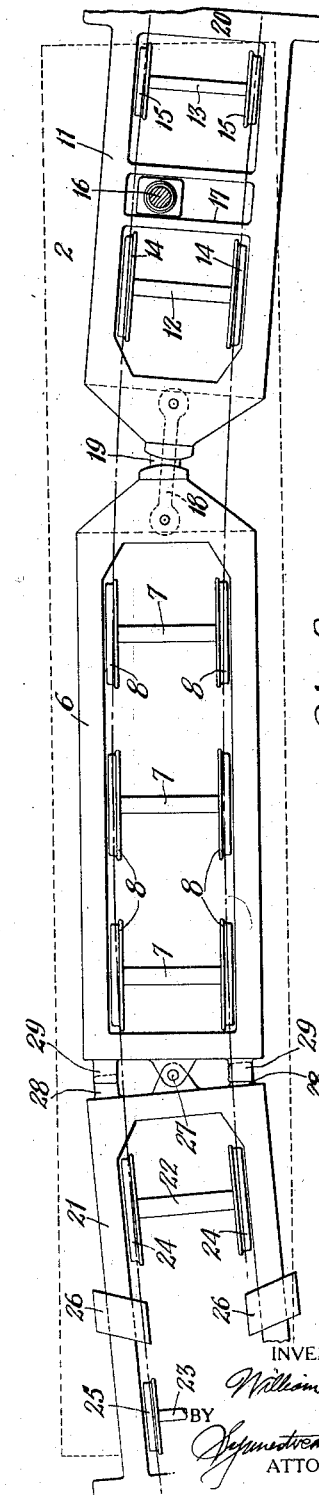
INVENTOR
William E. Woodard
BY
ATTORNEYS Patented Sept. 9, 1930

1,775,337

UNITED STATES PATENT OFFICE

WILLIAM E. WOODARD, OF FOREST HILLS, NEW YORK

LOCOMOTIVE

Application filed October 12, 1926. Serial No. 141,082.

This invention relates to locomotives, and particularly to the frame and truck structure and the equalizing mechanism thereof, and, as will further appear, is more especially applicable to that class of railway motive power units which use internal combustion engines as a source of power, or which obtain their power from third-rail or overhead electric conductors, and employ motors mounted on the axles as driving units.

In such self-propelled railway units, it is common practice to mount the several axles, with their motors, either on swiveling trucks, the pull of the motors being carried through the truck center pins to a frame which supports the cab, or else on a pair or more of trucks having articulated joints between them, the cab being supported on center pins and flexible bearings, and the pull of the motors being transmitted through the truck frames themselves on which the draft gear is directly mounted. A disadvantage of the first of these two constructions is that the line of draft must be carried above the trucks to the draft gears located on the ends of the main frame, and, on account of the length of such locomotives, the draft gear on curves may have a very large overhang or offset from the center line of the track. Moreover, the main frame which supports the superstructure must be made heavy enough to carry all the pulling and buffing strains to which the locomotive is subjected. The second general type of construction has the disadvantage that there is no means of equalizing the superimposed loads, as between the wheels of the several trucks. On this type, compressible side bearings are often used, the distribution of weight from the superstructure depending upon the amount of compression of these bearings.

It is an object of this invention to provide a construction embodying the advantages of each of the foregoing general types of locomotive construction, and obviating their disadvantages.

More specifically, the invention contemplates the provision of frame, truck and equalizer structure of great flexibility for negotiating curves and rough or uneven track, while maintaining proper distribution of weight upon the several wheels and axles, minimizing overhang of the draft rigging on curves, providing a low, direct line of transmission of the draft, and preserving comparative lightness in the weight of the main frame.

How these, and other advantages which will occur to those skilled in the art, are obtained will be evident from the following description of the invention, reference being had to the accompanying drawings, wherein:

Fig. 1 is a somewhat diagrammatic side elevation of a locomotive embodying my improvements, and Fig. 2 is a plan view of the truck arrangement with the locomotive on curved track.

Referring, first, to Fig. 1, it will be seen that the cab or superstructure 2 of the locomotive, together with the necessary power plant, such as a Diesel-engine, generator, blower, etc., indicated in dotted lines at 3, 4 and 5, is mounted on a main frame 6, which carries a plurality of axles 7 with their wheels 8, each axle being driven by a motor indicated at 9.

Beneath one overhanging end 10 of the main frame is positioned a swiveling truck having frame 11, a pair of axles 12 and 13 and wheels 14 and 15, although it should be understood that any suitable axle and wheel arrangement or number of axles may be employed. These axles may be without motors, or one or more of them may be equipped with motors, and, in the construction illustrated, I have shown a motor $9^a$ for driving the axle 12. This truck receives weight from the main frame 6 and the superstructure through a center pin 16 mounted near the end of said frame, the truck frame 11 having transverse ways 17 of usual construction permitting swiveling and lateral movement of the truck relative to the superstructure, as shown in Fig. 2. Draft connection between the truck and the main frame is provided by a drawbar and safety bar 18, 18$^a$ and a buffer 19, and any suitable draft gear (not shown) may be mounted at the end 20 of the truck frame.

At the opposite end of the main frame 6 is an articulated truck having frame 21, axles 22, 23, and wheels 24, 25, the axle 22 being here shown as equipped with a motor 9$^b$. Any suitable number of axles and arrangement of motors, however, may be employed. Weight from the superstructure and the overhanging end 10$^a$ of the main frame 6, is transmitted to the truck through any suitable sliding or rolling bearing means, such as the blocks 26, 26$^a$ (shown in Figs. 1 and 2) which will permit free lateral swinging of the truck around its articulated joint 27. Any vertical or rocking movement of the truck relative to the main frame is prevented by the unyielding bearings 26, 26$^a$, and the dove-tailed lugs 28, 29 positioned on each side of the joint 27 (see Fig. 2), so that these two frames constitute, in effect, one frame, except as regards their lateral flexibility for taking curves. This is of importance in connection with the equalizing mechanism below described. The draft between the frames is transmitted through the articulated joint 27, and suitable draft gear (not shown) may be mounted at the end 30 of the truck frame 21.

The equalizing mechanism, as clearly shown in Fig. 1, provides for the equalization together of all the wheels on one side of the main frame and the wheels of the articulated truck on the same side, by means of the lever 31 between the truck wheels, the levers 32, 32, between the wheels of the main frame, the lever 33 between the wheels of the truck and main frame, and the usual springs and links. A similar system equalizes together all the corresponding wheels on the other side of the locomotive. The wheels of the swiveled truck, however, are equalized in a separate system in a manner well known in the art.

It is obvious from the foregoing that the superstructure has a true three-point support with equalized distribution of the load under all conditions, the separately equalized swiveling truck with its center pin, constituting one virtual point of support, the wheels on one side of the main and articulated frames the second point, and the wheels on the opposite side the third point. Thus, I do not have to depend upon compressible side bearings or other similar devices in order to secure a true and proper equalization of weight between the various wheels, while, at the same time, the line of draft is carried directly through the three frames and not through the superstructure, thereby keeping it down near the track as well as near its center line, even on sharp curves where the superstructure of necessity is considerably offset, as indicated in dotted lines in Fig. 2. In addition, as already indicated, the main frame 6, with its extended or overhanging ends 10, 10$^a$, need not be heavier than necessary to carry the weight of the superstructure, since there is no draft connection at the ends thereof.

What I claim is:—

1. In combination in a railway vehicle, a main frame having wheels, a truck articulated to an end thereof, and a swiveling truck having end draft connection to the other end thereof.

2. In combination in a railway vehicle, a main frame having wheels, a truck articulated to an end thereof, and a swiveling truck having end draft connection to the other end thereof, together with weight-transmitting means between said main frame and said trucks.

3. In combination in a railway vehicle, a main frame having wheels, a truck articulated to an end thereof, a swiveling truck having draft connection to the other end thereof, bearer means for transmitting weight from the main frame to the articulated truck, and pivot means for transmitting weight from the main frame to the swiveling truck.

4. In a self-propelled railway unit having a main frame, wheels, and driving means therefor, a swiveling truck at one end thereof, an articulated truck at the other end, and means for carrying the draft through the swiveling truck frame, the main frame and the articulated truck frame.

5. In a self-propelled railway unit having a main frame, wheels, and driving means therefor, a swiveling truck at one end thereof, an articulated truck at the other end, means for transmitting the draft through the truck frames and the main frame, and means equalizing together the wheels of the articulated truck and the main frame.

6. In a self-propelled railway unit having a main frame, wheels, and driving means therefor, a swiveling truck at one end thereof, an articulated truck at the other end, means for transmitting the draft through the truck frames and the main frame, and separate equalizer means equalizing together, respectively, the wheels on one side of the articulated truck and the main frame, and the wheels on the other side thereof.

7. In a self-propelled railway unit, a plurality of frame members and wheels therefor, a swiveling truck having wheels, means equalizing together the wheels of said plurality of frame members, means articulating said frame members for transmission of the draft, and draft transmission means between one of said frame members and said swiveling truck permitting lateral and swiveling movement of the latter.

8. A main frame for a self-propelled railway vehicle in which certain of the driving axles are journalled, being extended at the ends so as to be adapted to transmit weight at one end through the center pin of a swiveling truck and at the other end through bearer means of a truck articulated to transmit draft.

9. A main frame for a self-propelled railway vehicle, having a mid-section in which certain of the driving axles may be journalled, being extended at its ends beyond the zone of its driving axles so as to be adapted at one end to transmit weight through the center pin of a swiveling truck and at the other end through bearer means of an articulated truck, together with means at each end of the mid-section for transmission of draft to the trucks.

10. A railway vehicle having a main frame with axles and wheels, a truck, with end draft connection to the main frame, having its wheels equalized together, weight transmitting means between the main frame and the truck permitting relative lateral and swiveling movement therebetween, a second truck having its wheels on each side equalized with the wheels on the respective side of the main frame, and weight transmitting bearer means between the main frame and said second truck.

11. A railway vehicle having a main frame with axles and wheels, a truck, with end draft connection to the main frame, having its wheels equalized together, weight transmitting means between the main frame and the truck permitting relative lateral and swiveling movement therebetween, a second truck having its wheels on each side equalized with the wheels on the respective side of the main frame, and weight transmitting bearer means between the main frame and said second truck permitting relative lateral swinging movement therebetween.

12. A railway vehicle having a main frame with axles and wheels, a truck having its wheels equalized together, weight transmitting means between the main frame and the truck permitting relative lateral and swiveling movement therebetween, a second truck having its wheels on each side equalized with the wheels on the respective side of the main frame, and weight transmitting bearer means between the main frame and said second truck, together with means transmitting buffing and pulling strains between each truck and the main frame.

13. A railway vehicle having a main frame with axles and wheels, a truck having its wheels equalized together, weight transmitting means between the main frame and the truck permitting relative lateral and swiveling movement therebetween, a second truck having its wheels on each side equalized with the wheels on the respective side of the main frame, and weight transmitting bearer means between the main frame and said second truck, together with draft connections between the main frame and said trucks, the connection between said frame and said second truck being an articulated joint.

14. A railway vehicle having a main frame with axles and wheels, a truck having its wheels equalized together, weight transmitting means between the main frame and the truck permitting relative lateral and swiveling movement therebetween, a second truck having its wheels on each side equalized with the wheels on the respective side of the main frame, and weight transmitting bearer means between the main frame and said second truck permitting radial movement of the truck, together with draft connections between the main frame and said trucks, the connection between said frame and said second truck being an articulated joint permitting radial movement of the truck.

15. In a self-propelling railway vehicle, a main frame adapted to carry the vehicle superstructure and having axles and wheels, the ends of said frame providing clearance therebeneath for truck structures, a swiveling truck beneath one end of the frame, and an articulated truck beneath the other end of said frame, at least one of said trucks having means for transmitting pull and buff.

16. In a self-propelling railway vehicle, a main frame adapted to carry the vehicle superstructure and having axles and wheels, the ends of said frame providing clearance therebeneath for truck structures, a swiveling truck beneath one end of the frame, and an articulated truck beneath the other end of said frame, together with means for transmitting weight and draft between said frame and each of said trucks.

17. In a self-propelling railway vehicle, a super-structure, a cantilever-like frame supporting the weight thereof, axles and wheels mounted in the mid-portion of said frame, wheeled trucks mounted beneath the overhanging ends of said frame, and equalizing mechanism for all the wheels constructed to provide three virtual points of support for the superposed weight.

18. In a self-propelling railway vehicle, a super-structure, a cantilever-like frame supporting the weight thereof, axles and wheels mounted in the mid-portion of said frame, wheeled trucks mounted beneath the overhanging ends of said frame, and equalizing mechanism for all the wheels constructed to provide three virtual points of support for the superposed weight, said trucks having draft connection to said frame at the inner ends of said overhanging portions thereof.

19. In a self-propelling railway vehicle, a super-structure, a cantilever-like frame supporting the weight thereof, axles and wheels mounted in the mid-portion of said frame, wheeled trucks mounted beneath the overhanging ends of said frame, and equalizing mechanism for all the wheels constructed to provide three virtual points of support for the superposed weight, said trucks having draft connection to said frame at the inner ends of said overhanging portions thereof, and being free to swing laterally with respect to the ends of the superstructure and frame.

In testimony whereof I have hereunto signed my name.

WILLIAM E. WOODARD.